Feb. 17, 1942.   H. W. HEYMAN   2,273,487
STRAIN-RELIEF MEANS FOR ELECTRICAL CORDS
Filed Nov. 16, 1940
Fig. 1
Fig. 2
Fig. 4
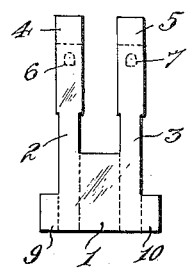
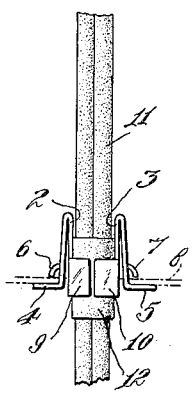
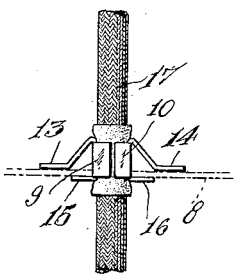
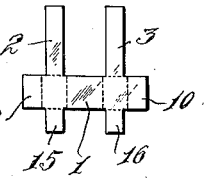
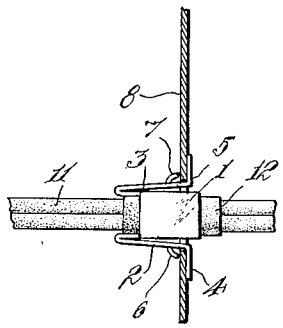
Fig. 3
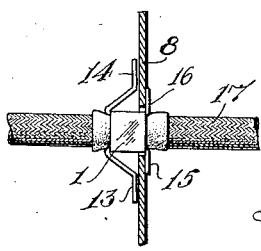
Fig. 5
Fig. 6
INVENTOR
Horace W. Heyman
BY
A. D. T. Libby
ATTORNEY Patented Feb. 17, 1942

2,273,487

UNITED STATES PATENT OFFICE 2,273,487

STRAIN-RELIEF MEANS FOR ELECTRICAL CORDS

Horace W. Heyman, Kenilworth, N. J.

Application November 16, 1940, Serial No. 365,902

5 Claims. (Cl. 173—322)

This invention relates to a strain-relief means for electrical cords which pass through a support plate such as usually found in a radio receiving set, although not limited to this particular use.

Where an electrical cord or conductor passes through an instrument plate or support member, it has been the general practice in the past to use a soft rubber bushing or grommet to support or protect the cord or cable from the plate, especially where the plate is of relatively thin metal. Such a mounting, however, does not provide proper strain relief to the cord and, especially, does not provide any relief from torque strains.

It is therefore the principal object of my invention to provide a strain-relief means which has the advantage of being easy to assemble on the cord or conductor, and one that is readily installed in position on the mounting or support plate or member, as well as one that will relieve the cord or cable of push-and-pull strains and torque strains.

A further advantage is that with the arrangement to be herein described, when the strain relief is installed on the cord and the whole passed into the opening provided in the plate or support member, the cord or conductor itself does not engage or rub against any sharp edges of the opening in the plate or case, the cord being entirely held by the strain-relief device.

My improved form of strain-relief device will be clear from the following description taken in connection with the annexed drawing, wherein:

Figure 1 is a blank of one form of my invention.

Figure 2 is a view of the device when assembled to one type of cord or cable.

Figure 3 is a blank showing another form of my invention.

Figure 4 shows the form of Figure 3 when assembled to a cord of a different type than that shown in Figure 2.

Figure 5 is a view showing the device of Figure 2 installed in position on a plate or support member.

Figure 6 is a view showing the device of Figure 4 likewise installed in position on a plate or support member.

In Figure 1, I is the body portion of a member of a suitable metal which has considerable strength and resilience, such as steel, which may be cadmium-plated or otherwise treated to prevent rusting. Extending from the body portion 1 are two arms 2 and 3 which, as shown in Figure 2, are bent backwardly along the side of the body portion 1. The extremities 4 and 5 of the arms 2 and 3 are bent outwardly as indicated in Figure 2. Also, the arms 4 and 5 have integral lugs 6 and 7 forced outwardly at a distance from the ends 4 and 5 approximately equal to the thickness of the support member 8 on which the device is to be mounted. The body portion also has ears 9 and 10 which are adapted to be bent or swaged around the cord or cable 11 as indicated in Figure 2. Preferably, the cord is first wrapped with a piece of tape 12 of suitable material so as to allow a strong swaging action to be applied to the metallic member, whereby it will very securely grip the cord in position as shown in Figure 2.

After the metallic member has been assembled to the cord, the same is ready to be used in the plate 8 which is provided with a polygonally shaped hole, in this case, substantially rectangular and of a width just sufficient to pass the cord with the metallic member installed thereon. When the cord has been passed through the opening in the plate 8, the arms 2 and 3, which have considerable resilience, are forced downwardly against the sides of the metallic member until the lugs or catches 6 and 7 pass into the position shown in Figure 5, when the arms will snap outwardly so that the ends 4 and 5 will engage the plate 8 on the side opposite to that engaged by the lugs 6 and 7.

From Figure 5 it will be seen that the cord or cable 11 is then locked in position on the plate 8 against push and pull, and because the orifice or opening in the plate 8 is made substantially like the form of the metallic member when swaged to the conductor 11, the metallic member and cable 11 cannot be turned in the plate 8, so that the metallic member will relieve the cord 11 of all strains.

In Figure 3 the blank for the member is somewhat different from that shown in Figure 1, in that the arms 2 and 3 are bent in a little different form, whereby the ends 13 and 14 engage the plate or support member 8 on the back side, on one side, while ears 15 and 16 are provided to engage the plate 8 on the opposite side, but the cable 17, which is shown in Figure 6 as being a different type than heretofore, is securely held by the metallic member from all push and pull and torque strains, it being understood that the opening in the member 8 is of a type as described with respect to the construction shown in Figure 2; that is to say, the opening is similar to the general form of the body of the metallic member when swaged into position on the conductor cable.

While the cable or cord 17 shown in Figure 4 is round, as is usually the case where twisted conductors are used, when the metallic member is swaged into position, it will crowd the wires into a position about the same as the conductors shown in Figure 2, which illustrates a two-conductor cable which has more or less recently come into considerable use in the trade.

What I claim is:

1. Strain-relief means for an electrical cord comprising in combination with a plate having a polygonal opening therein, a metallic member having a body portion adapted to be swaged around the cord into a polygonal form to fit the opening in the plate, the body having arms extending therefrom and bent backwardly over the body and having their ends bent to engage one side of the plate, and catches on the arms spaced from said arm ends a distance approximately the thickness of the plate, whereby the plate will be engaged on opposite sides by the said ends and catches when the said cord with the metallic member is inserted into the opening in the plate.

2. The combination of a cord and a support member having a polygonally shaped opening therein and strain-relief means for the cord going through the opening comprising a metallic member having a body portion to be swaged into polygonal form similar to said opening around the cord into gripping relation therewith, the body having resilient arms positioned on opposite sides of the cord and extending alongside the body, the arms having outwardly turned ends to engage one side of the support member and also having integral lugs adjacent said ends forming catches to engage the opposite side of the support member when the cord with the metallic member attached thereto is inserted into the opening.

3. The combination of a plate member having a polygonally shaped opening therein and a strain-relief and torque clip for an electrical conductor adapted to pass through said plate opening, the clip comprising a single-piece metallic member having a body portion adapted to be swaged tightly around the conductor to a shape to fit the opening in said plate, so the said member and conductor cannot turn in the opening, the said member having resilient formations extending from the body portion with parts to engage the plate on opposite sides to hold the metallic member securely in the plate opening when the conductor and attached clip are pushed into the plate opening.

4. Strain-relief means for an electrical cord comprising a single-piece metallic member having a body portion adapted to be swaged tightly around the cord, the member having resilient formations extending from the body portion, the formations having parts adapted to engage a support plate on opposite sides thereof and adjacent a hole in the plate, when the conductor and metallic member swaged thereto are passed into the hole.

5. Strain-relief means for an electrical cord comprising a single-piece metallic member adapted to be swaged tightly around the cord, the member having resilient arms with formations adapted to automatically engage the opposite sides of a support plate adjacent a hole therein, on inserting the conductor, carrying said member, through the hole, whereby the said arms with the formations will snap into place to lock the cord to the plate, the formations on the arms on one side of the plate being engageable to move the arms to a releasing position with respect to the plate.

HORACE W. HEYMAN.